(12) United States Patent
Fortl

(10) Patent No.: US 12,552,511 B2
(45) Date of Patent: Feb. 17, 2026

(54) PLANETARY GEARSET AND A TRANSMISSION WITH THE PLANETARY GEARSET

(71) Applicant: Karel Fortl, Prague (CZ)

(72) Inventor: Karel Fortl, Prague (CZ)

(*) Notice: Subject to any disclaimer, the term of this patent is extended or adjusted under 35 U.S.C. 154(b) by 38 days.

(21) Appl. No.: 18/380,757

(22) Filed: Oct. 17, 2023

(65) Prior Publication Data
US 2024/0140579 A1    May 2, 2024

Related U.S. Application Data

(60) Provisional application No. 63/419,737, filed on Oct. 27, 2022.

(51) Int. Cl.
*B63H 23/06* (2006.01)
*B63H 23/02* (2006.01)
*F16H 1/46* (2006.01)

(52) U.S. Cl.
CPC ............... *B63H 23/06* (2013.01); *F16H 1/46* (2013.01); *B63H 2023/0283* (2013.01)

(58) Field of Classification Search
CPC ............ B63H 23/06; B63H 2023/0283; F16H 2001/2881; F16H 2001/289; F16H 2200/2007
See application file for complete search history.

(56) References Cited

FOREIGN PATENT DOCUMENTS

DE    102015205264 A1 *   9/2016    ............... F16H 1/46

OTHER PUBLICATIONS

FIT translation (Year: 2016).*

* cited by examiner

*Primary Examiner* — Huan Le
(74) *Attorney, Agent, or Firm* — Rivka Friedman

(57) ABSTRACT

The planetary gearset has different areas of use. Transmissions are intended for example for marine propulsion device. A main planetary gearset that connects the input shaft to the output shaft so as to drive the output shaft into forward rotation. A complementary planetary gearset together with the main planetary gearset that connect the input shaft to the output shaft so as to drive the output shaft into reverse rotation. A forward brake engages the main planetary gearset in a forward gear wherein the main planetary gearset drives the output shaft into the forward rotation. A reverse brake engages the complementary planetary gearset in a reverse gear wherein the complementary planetary gearset together with the main planetary gearset drive the output shaft into the reverse rotation.

18 Claims, 14 Drawing Sheets

PLANETARY GEARSET AND A TRANSMISSION WITH THE PLANETARY GEARSET

FIELD OF THE INVENTION

The invention relates to a planetary gearset in a transmission, whose main area of use is in a drivetrain of a marine propulsion device, where an internal combustion engine provides power to the drivetrain, which then drives the propeller or propellers of the propulsion unit at a reduced speed to thrust a marine vessel in water. Of course, the planetary gearset can have a whole range of other applications, from miniature gearing e.g., in watchmaking, automotive transmissions including hybrids, drive units of outboard motors and stern drives up to transmissions of agricultural tractors or heavy equipment such as wheel loaders, compactors, dozers, graders and so on. The planetary gearset can serve as a speed increaser, a speed reducer or a power splitting device that may be positioned on the input of a drivetrain as well as in the middle of a drivetrain or on the output of a drivetrain.

BACKGROUND OF THE INVENTION

For propelling of propellers or multitudes of propellers of marine vessels having internal combustion engines on power in a range from 220.7 kW (300 PS) at SUZUKI DF300B to 447.3 kW (600 hp) at MERCURY Verado 600 hp 7.6 L V12 there are used transmissions described e.g. in patent documents U.S. Pat. No. 9,708,048 B2, U.S. Pat. No. 9,731,803 B2, U.S. Pat. No. 9,908,604 B2, US 20180148149 A1, U.S. Ser. No. 10/875,616 B2, U.S. Pat. No. 8,425,373 B2, U.S. Pat. No. 9,676,463 B1, U.S. Pat. No. 9,759,321 B1, U.S. Pat. No. 9,919,783 B1, U.S. Pat. No. 9,964,210 B1, U.S. Ser. No. 10/239,598 B2, U.S. Ser. No. 10/502,312 B1.

The main disadvantages of known transmissions according to U.S. Pat. No. 9,708,048 B2, U.S. Pat. No. 9,731,803 B2, U.S. Pat. No. 9,908,604 B2 and US 20180148149 A1 by Suzuki are that the transmission has a bevel gearset, which is difficult to manufacture and its difficult assembly requires gaging and shimming. The bevel gears have clutches with dog teeth formed into them. The shifting these dog clutches without the benefit of speed synchronization cause noisy punches and a damage given by at least the idling speed of the engine and the moment of inertia of the crankshaft with the flywheel and the moment of inertia of the propellers and they are partially mitigated by the torsional elasticity of the torsional rubber damper inside the propeller. The forward gear can be only direct 1:1, thus speed reduction must be ensured either by the final drive or a combination of partly by a speed reduction in front of the reversing transmission and partly by the final drive. The horizontally arranged idler shaft with the bevel gear and the shifting mechanism at an unusual place occupies a space at the expanse of the exhaust piping.

The transmission for Mercury Marine according to U.S. Pat. No. 10,875,616 B2 by ZF has a plurality of gear pairs with large installation dimensions in the horizontal direction and wet multi-disc clutches with large installation dimensions in both the horizontal directions and in the vertical direction together with a practical impossibility of integration of the transmission into the gearcase housing. This results a necessity of its placement in the drive shaft housing, where the torsional elasticity of a short or no drive shaft substitutes a necessarily added dedicated torsional vibration damper and where steering is not realized by yawing of the entire outboard motor, but only by its gearcase housing, which must be steerable. The transmission casing cannot be neither light nor simple because it has three axes for shafts. An expansive and complicated and to the environment susceptible hydraulic is required to control the multi-disc clutches which require a complicating compensation of a centrifugal pressure in their rotating pistons and which have more moving seals subjected to wear. In addition, three multi-disc clutches with the vertical axes causes significant power losses as well as double or triple of gear pair, over which power flows.

The transmission according to U.S. Pat. No. 8,425,373 B2 by Yamaha has a more compact installation space given by planetary gearsets in the horizontal direction and limited in the vertical direction primarily by multi-disc clutches with the other drawbacks described in the previous paragraphs. The transmission can be partially integrated in the gearcase housing and the steering can be usual simple yawing of the entire outboard motor.

The transmission according to U.S. Pat. No. 9,676,463 B1, U.S. Pat. No. 9,759,321 B1, U.S. Pat. No. 9,919,783 B1, U.S. Pat. No. 9,964,210 B1, U.S. Ser. No. 10/239,598 B2, U.S. Ser. No. 10/696,370 B1 by Mercury Marine has two planet carriers and also complicatedly joined components of planetary gearsets with a castle joint, splined joints and bolted joints, which increase the installation space both in the horizontal direction and in the vertical direction.

DISCLOSURE OF THE INVENTION

In the previous paragraphs described drawbacks to a great extent removes a transmission with a planetary gearset according to the proposed invention. In certain examples, the transmission is for a marine propulsion device having an internal combustion engine that drives a propulsor for propelling a marine vessel in water. An input shaft is driven into rotation by the engine. An output shaft drives the propulsor into rotation. A main planetary gearset connects the input shaft to the output shaft so as to drive the output shaft into forward rotation. A complementary planetary gearset together with the main planetary gearset connect the input shaft to the output shaft so as to drive the output shaft into reverse rotation. A forward brake engages the main planetary gearset in a forward gear wherein the main planetary gearset drives the output shaft into the forward rotation. A reverse brake engages the complementary planetary gearset in a reverse gear wherein the complementary planetary gearset together with the main planetary gearset drive the output shaft into the reverse rotation. In other examples, the planetary gearset can have a lot of areas of use that at least some others are shown at the attached drawings and described in the examples of implementation.

BRIEF DESCRIPTION OF THE DRAWINGS

The present disclosure is described with reference to the following Figures. The same numbers are used throughout the Figures to reference like features and like components.

PREFERRED EMBODIMENTS OF THE INVENTION

Figure 1:
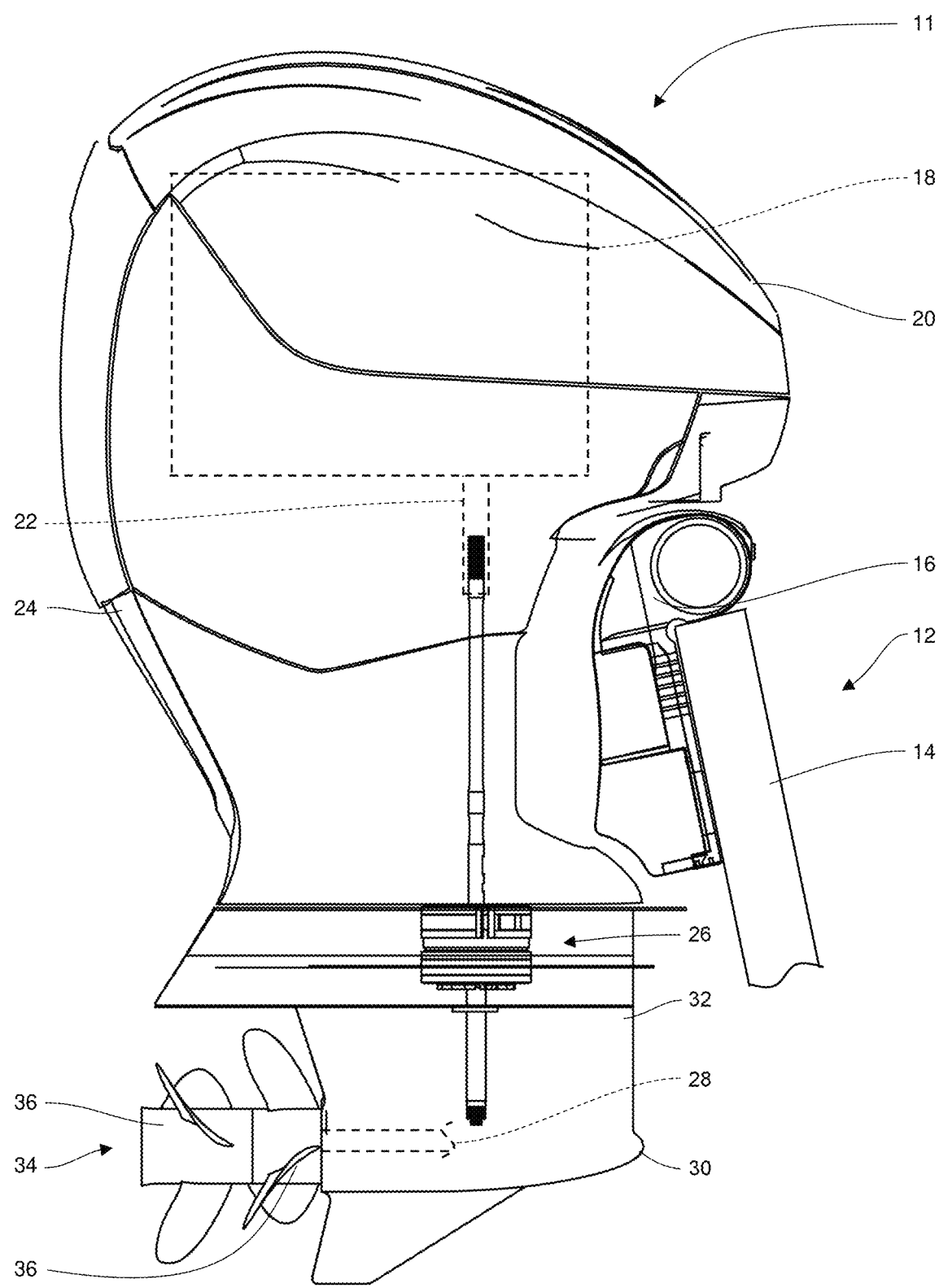
FIG. 1 is a side view of an outboard marine propulsion device.

FIG. 1 depicts an outboard marine propulsion device 11 for propelling a marine vessel 12 in water. The outboard marine propulsion device 11 is connected to the transom 14 of the marine vessel 12 by a transom bracket 16. As is conventional, the outboard marine propulsion device 11 includes an internal combustion engine 18 located within an upper cowling 20. The engine 18 causes rotation of a drive shaft 22 that extends downwardly from the engine 18 through a drive shaft housing 24. A transmission 26 relays rotational force from the drive shaft 22 to a propulsor shaft 28 located in a propulsor shaft housing 30. The transmission 26 is located in or above a gearcase housing 32, which is disposed beneath the drive shaft housing 24. Rotation of the propulsor shaft 28 causes rotation of a propulsor 34, which in this example includes counter rotating propellers 36. The type of propulsor 34 can vary from that which is shown, and in other examples can include single or multiple propellers or single or multiple impellers, and/or the like.

Embodiments of the transmission 26 are shown in FIGS. 2-12. Referring to FIGS. 2-6, the transmission 26 includes an input shaft 38 that is driven into rotation by the engine 18. The input shaft 38 can be the drive shaft 22 or an extension of the drive shaft 22 such that rotation of the drive shaft 22 causes concurrent rotation of the input shaft 38. The transmission 26 also includes an output shaft 40 that is connected to the propulsor shaft 28 via for example a conventional gearset (not shown) such that rotation of the output shaft 40 causes concurrent rotation of the propulsor shaft 28. The input shaft 38 and output shaft 40 are connected together by main and complementary planetary gearsets 42, 44 such that the input shaft 38 and output shaft 40 are coaxially aligned.

A planetary gearset 27 is composed of the main planetary gearset 42 and the complementary planetary gearset 44.

As will be described in more detail herein below, the main planetary gearset 42 connects the input shaft 38 to the output shaft 40 so as to drive the output shaft 40 into forward rotation. The complementary planetary gearset 44 together with the main planetary gearset 42 connect the input shaft 38 to the output shaft 40 so as to drive the output shaft 40 into reverse rotation. The main and complementary planetary gearsets 42, 44 both provide the same or similar speed reduction from the input shaft 38 to the output shaft 40. In one non-limiting example, the nominal reduction is 1.667:1. A forward brake 46 engages the main planetary gearset 42 in forward gear so as to drive the output shaft 40 into the forward rotation. A reverse brake 48 engages the complementary planetary gearset 44 together with the main planetary gearset 42 in reverse gear so as to drive the output shaft 40 into the reverse rotation. Actuation of neither of the forward brake 46 and reverse brake 48 actuates a neutral gear wherein the output shaft 40 is disconnected from the input shaft 38.

Referring to FIGS. 3-6, the main planetary gearset 42 includes a main ring gear 50 that is fixed to and rotates with the input shaft 38. The main ring gear 50 and the input shaft 38 can be formed together as one piece or can be separate pieces that are connected together. The main ring gear 50 includes a radially inwardly facing gear surface 52. The main planetary gearset 42 also includes a main sun gear 54 that is coaxially disposed on a lower casing extension 55 (see FIGS. 10-12). The main sun gear 54 has a radially outwardly facing gear surface 56 and a radially inwardly facing bearing surface 58. The radially inwardly facing bearing surface 58 bears on the lower casing extension 55 such that the main sun gear 54 is rotatable with respect to the lower casing extension 55. The type of bearing surface can vary and in this example includes a roller bearing 59. The main planetary gearset 42 further includes a forward brake drum 60 that rotates with the main sun gear 54. The forward brake drum 60 can be formed as one component with the main sun gear 54 or the forward brake drum 60 can be a separate component that is attached to the main sun gear 54.

The main planetary gearset 42 further includes a plurality of main planet gears 62 that are rotatable about their own center axis 64 and that are radially disposed between the main ring gear 50 and the main sun gear 54. Each main planet gear 62 has a radially outwardly facing gear surface 66 that is engaged with the radially inwardly facing gear surface 52 of the main ring gear 50 and it also has a radially outwardly facing gear surface 67 that is engaged with the radially outwardly facing gear surface 56 of the main sun gear 54.

The main planetary gearset 42 further includes a main carrier 68 that retains the plurality of main planet gears 62 so that the main planet gears 62 are rotatable about their own center axis 64. The main carrier 68 is fixed to and rotates with the output shaft 40 and is rotatable with respect to the main ring gear 50 and the main sun gear 54. The main carrier 68 and the output shaft 40 can be formed together as one piece or can be separate pieces that are connected together.

The complementary planetary gearset 44 includes a complementary sun gear 74 that is fixed to and rotates with the main sun gear 54 and forward brake drum 60. The complementary sun gear 74 can be formed as one component with the main sun gear 54 and forward brake drum 60 or formed separately from and connected to the main sun gear 54 and forward brake drum 60. The complementary sun gear 74 has a radially outwardly facing gear surface 76. The complementary planetary gearset 44 also has a complementary ring gear 78 that is fixed to and rotates with the reverse brake drum 94. The complementary ring gear 78 and reverse brake drum 94 can be formed together as one piece or can be separate pieces that are connected together. A bearing 97, such as roller bearing, support the complementary ring gear 78 with respect to the upper casing extension 99 (see FIGS.

10-12). The complementary ring gear 78 includes a radially inwardly facing gear surface 84.

The complementary planetary gearset 44 further includes a plurality of complementary planet gears 86 that are rotatable about their own center axis 88 and that are radially disposed between the complementary ring gear 78 and complementary sun gear 74. Each complementary planet gear 86 has a radially outwardly facing gear surface 90 that is engaged with the radially inwardly facing gear surface 84 of the complementary ring gear 78 and the radially outwardly facing gear surface 76 of the complementary sun gear 74.

Figure 18:
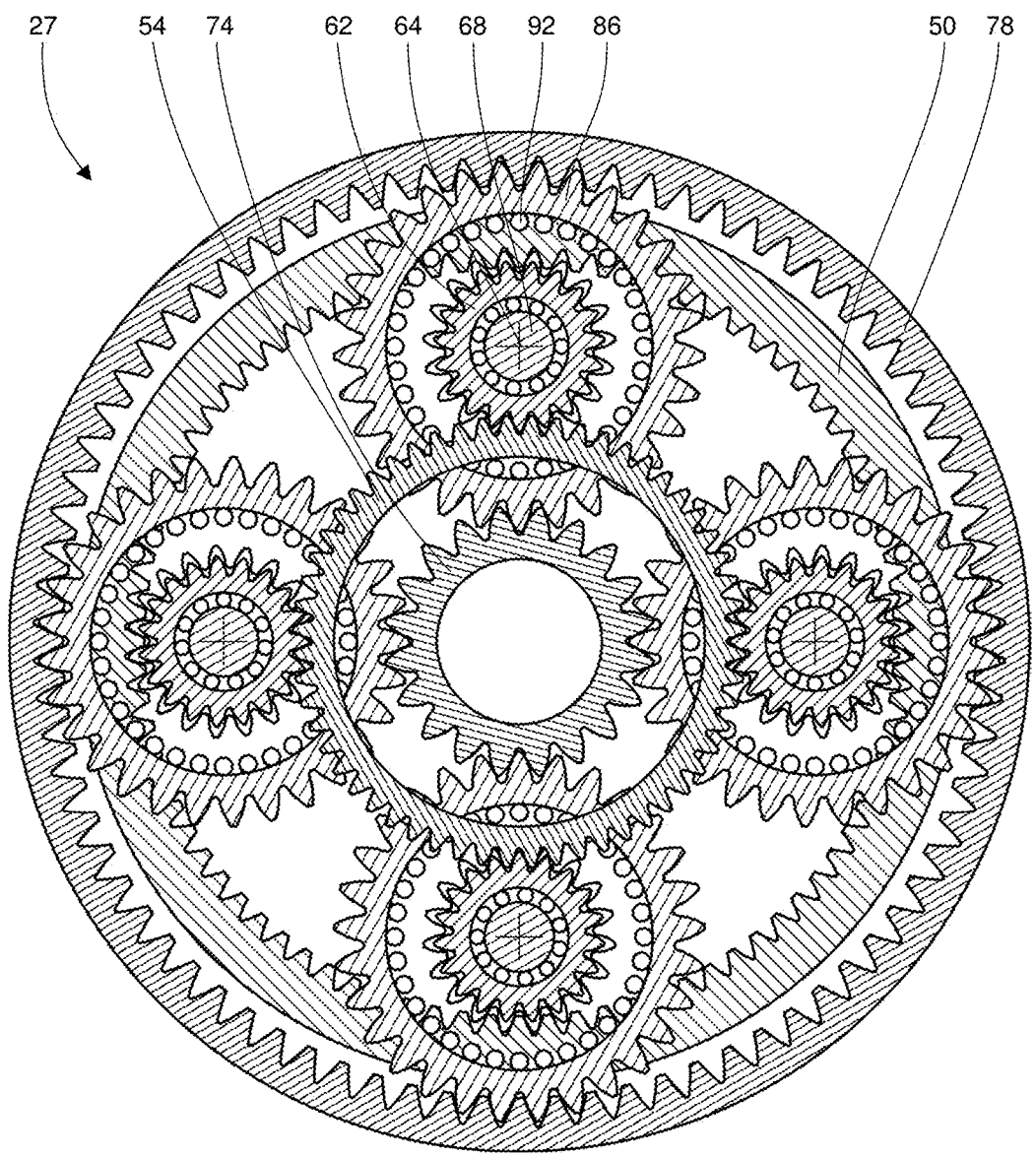
FIGS. 18-19 are views of a planetary gearset with main planet gears in complementary planet gears.
Figure 19:
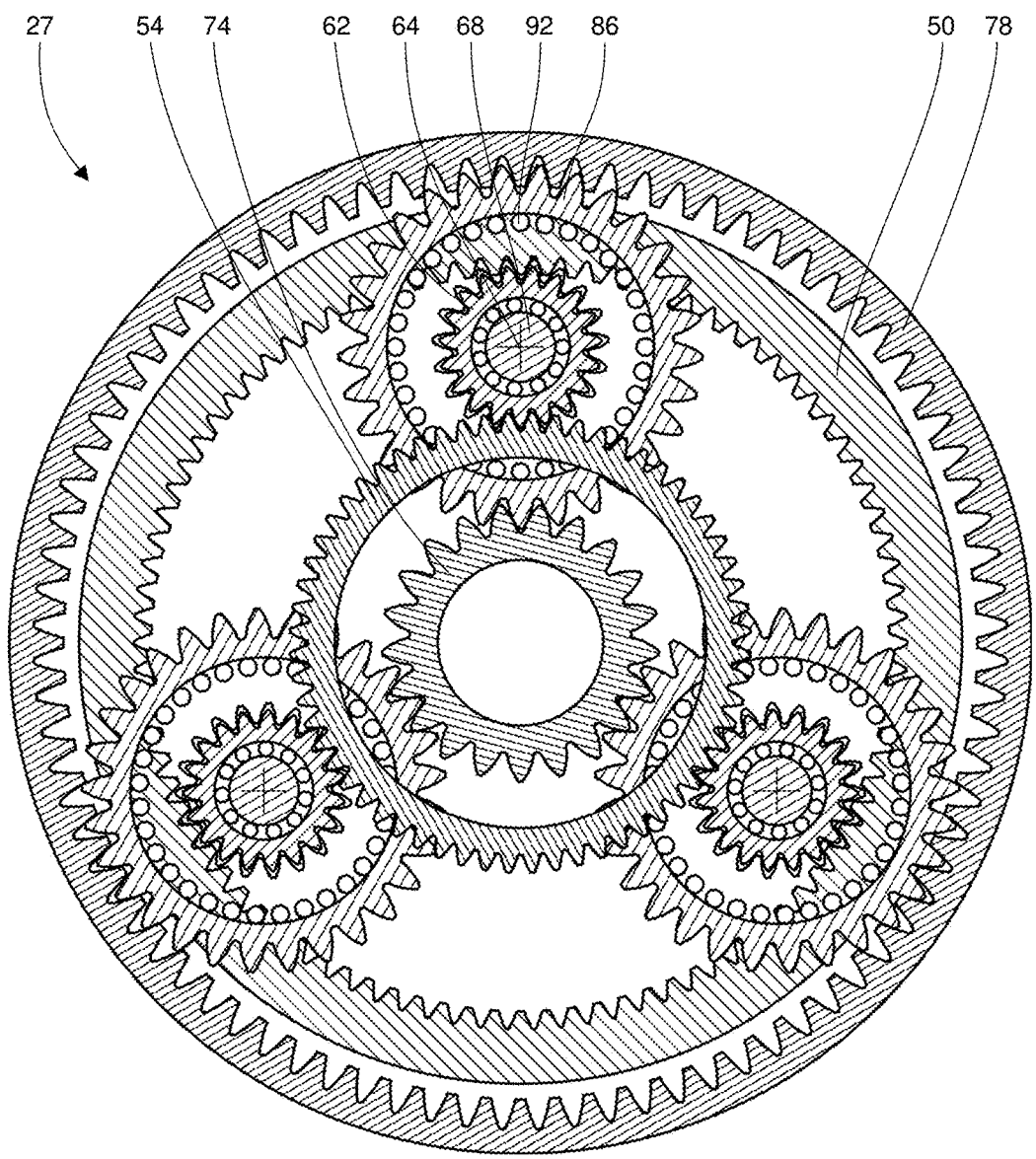

In one embodiment shown in FIG. 18-19, the complementary planetary gearset 44 uses interplanetary bearings 92 and the main planet gears 62 and the main carrier 68 to retain the complementary planet gears 86 so that the complementary planet gears 86 are rotatable about their own center axis 88. In this embodiment, the main planet gears 62 are coaxially aligned with the complementary planet gears 86 so that each main planet gear 62 is disposed inside each complementary planet gear 86. In this embodiment, the center axes 64 of the main planet gears 62 and the center axes 88 of the complementary planet gears 86 are identical.

Figure 20:
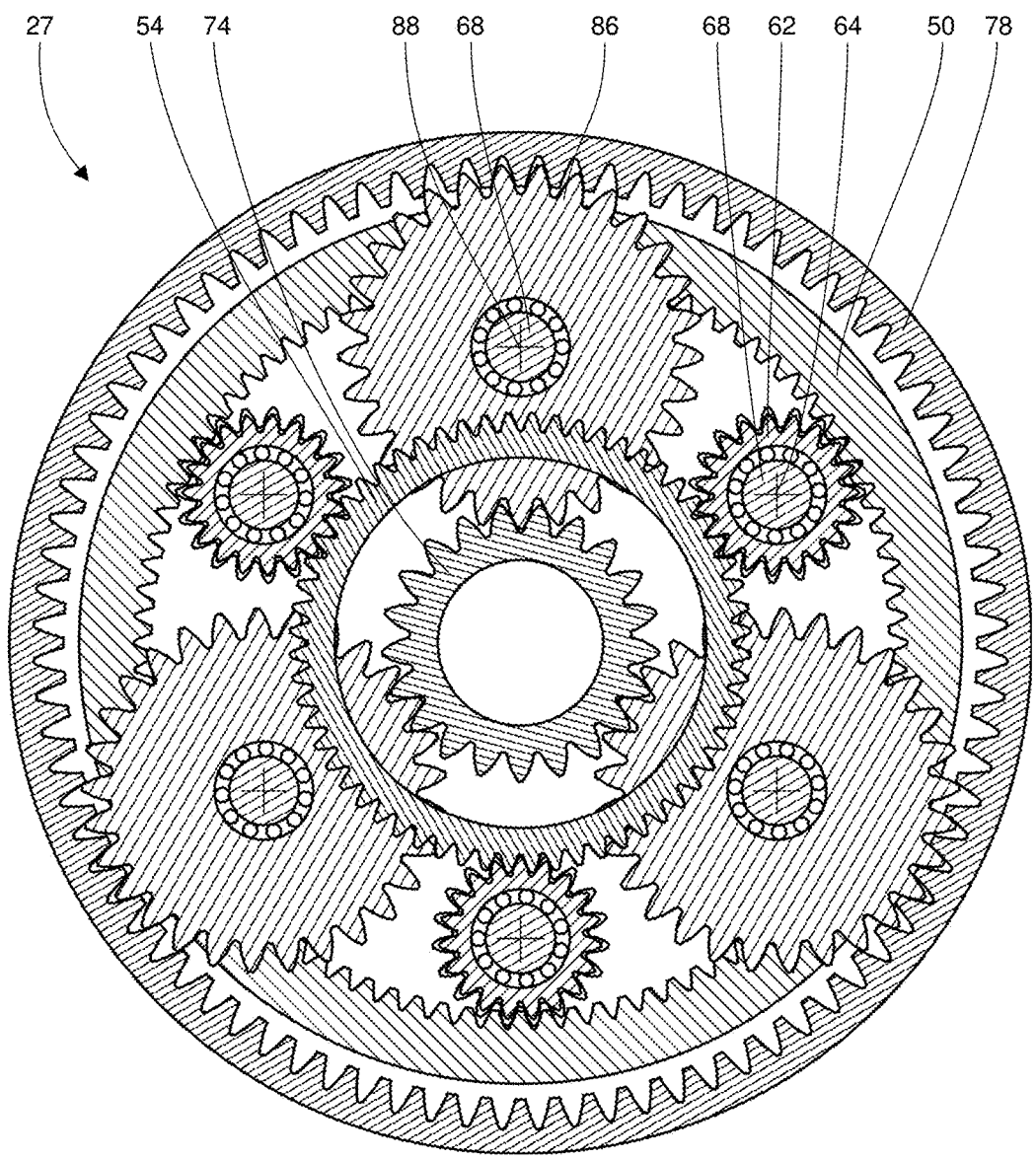
FIG. 20 is a view of a planetary gearset with main planet gears between complementary planet gears.

In another embodiment shown in FIG. 20, the complementary planetary gearset 44 uses the main carrier 68 to retain the complementary planet gears 86 so that the complementary planet gears 86 are rotatable about their own center axis 88. In this embodiment the main planet gears 62 are disposed between the complementary planet gears 86 thus the main planet gears 62 are not coaxially aligned with the main planet gears 86 and the center axes 64, 88 are not identical.

Figure 7:
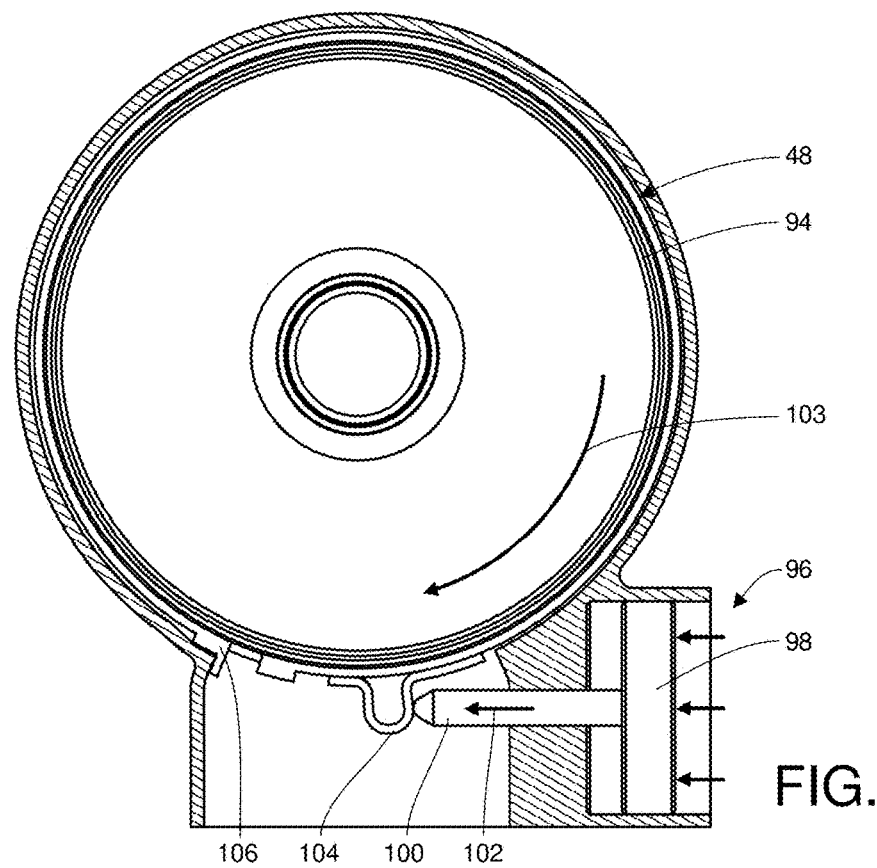
FIG. 7 is a top view of a brake for the transmission.
Figure 8:
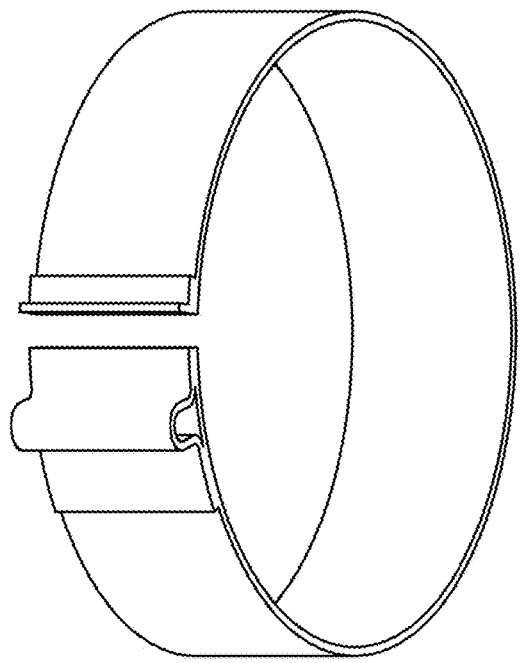
FIG. 8 is a perspective view of a band brake for the transmission.
Figure 9:
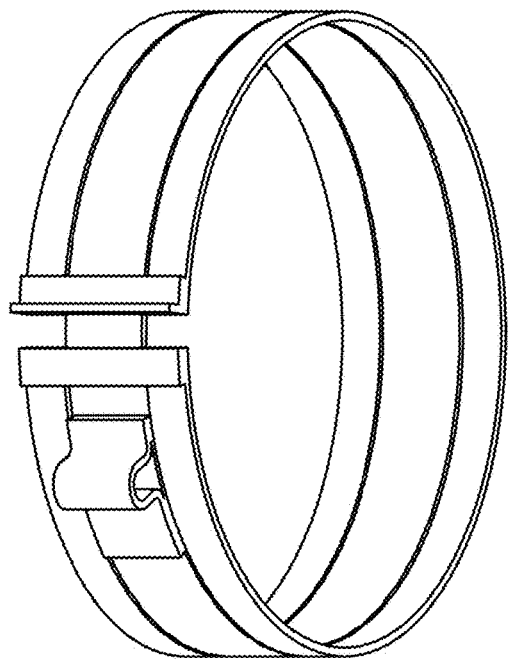
FIG. 9 is a perspective view of another type of band brake for the transmission.

Referring to FIGS. 7-9, the exact construction of the forward and reverse brakes 46, 48 can vary. In certain examples the forward and reverse brakes 46, 48 are conventional single-wrapped band brakes, as shown in FIG. 8. In certain examples the forward and reverse brakes 46, 48 are conventional double-wrapped band brakes, as shown in FIG. 9. The functionality of single-wrapped band brakes and double-wrapped band brakes generally is the same except the torque capability of the double-wrapped band brakes is higher than the single-wrapped band brakes for the same actuation force. In the example of FIGS. 2-6, the forward and reverse brakes 46, 48 are wrapped around and act on the forward and reverse brake drums 60, 94. Tightening the band brake prevents rotation of the brake drum. Loosening the band brake allows rotation of the brake drum.

FIG. 7 depicts one example wherein the reverse brake 48 is a double-wrapped band brake that is wrapped around the reverse brake drum 94. The forward brake 46 and forward brake drum 60 can be configured in the same manner. Actuators 96 are configured to actuate the forward or reverse brake 46, 48. The type of actuator can vary from that which is shown. In this example, the actuator 96 includes a servo-motor 98 that moves a pin 100 in the direction of arrow 102 against a bearing bracket 104 disposed at one end of the reverse brake 48. The other end of the reverse brake 48 is fixed to a gearcase housing 106. Movement of the pin 100 in the direction of arrow 102 tightens the reverse brake 48 about the reverse brake drum 94, thus preventing the reverse brake drum 94 from rotating. In this example, the forward and reverse brakes 46, 48 are self-energized, which means that the direction of rotation of the forward and reverse brake drums 60, 94 (as shown at arrow 103) is the same as the direction of actuation shown at arrow 102. Thus, rotation of the brake drums 60, 94 assists actuation of the forward and reverse brakes 46, 48. Movement of the pin 100 opposite the direction of arrow 102 loosens the reverse brake 48 with respect to the reverse brake drum 94, thus allowing the reverse brake drum 94 to rotate.

Figure 10:
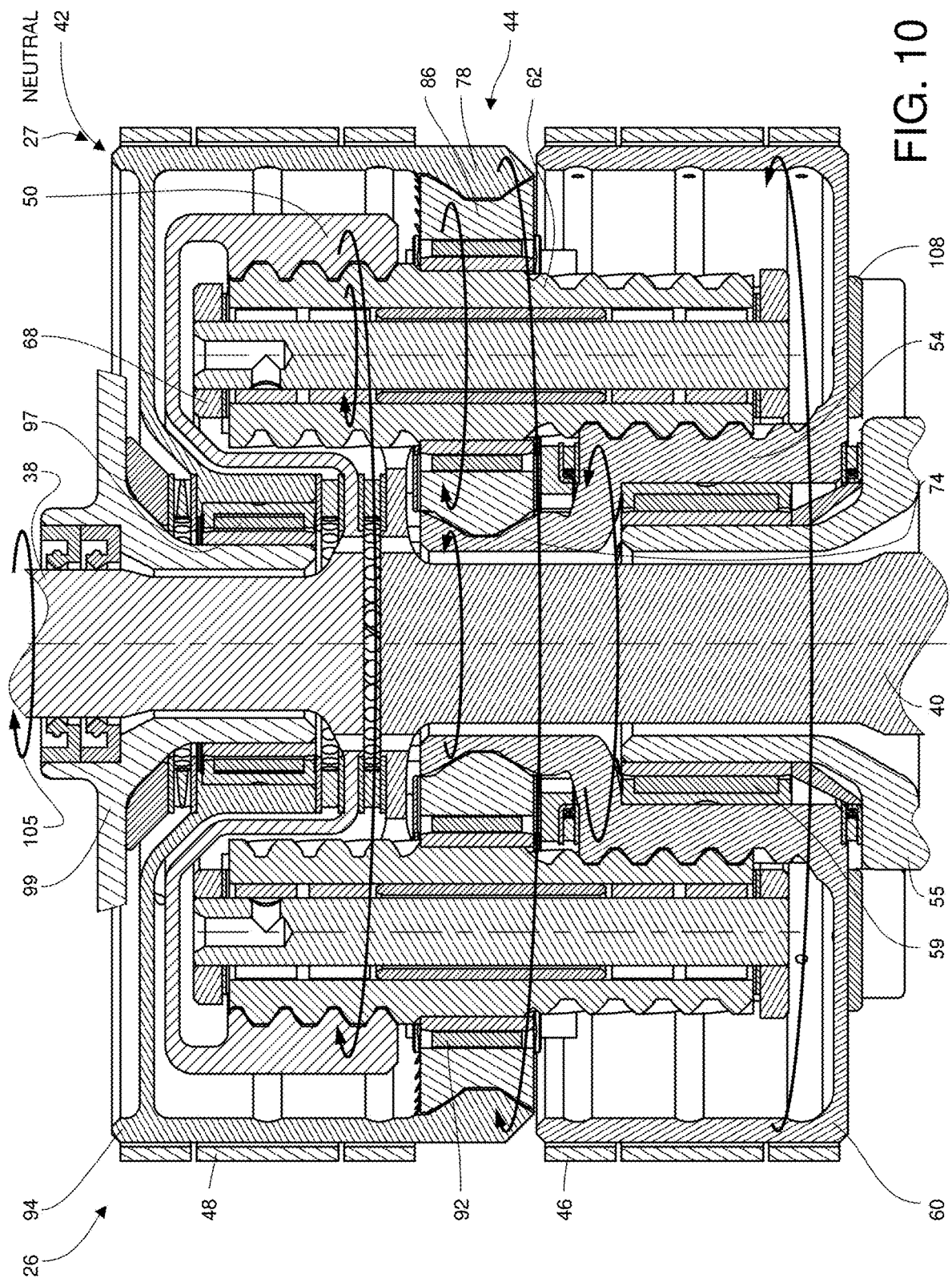
FIG. 10 is a view of section 10-10 taken in FIG. 2, showing the transmission in neutral gear.
Figure 11:
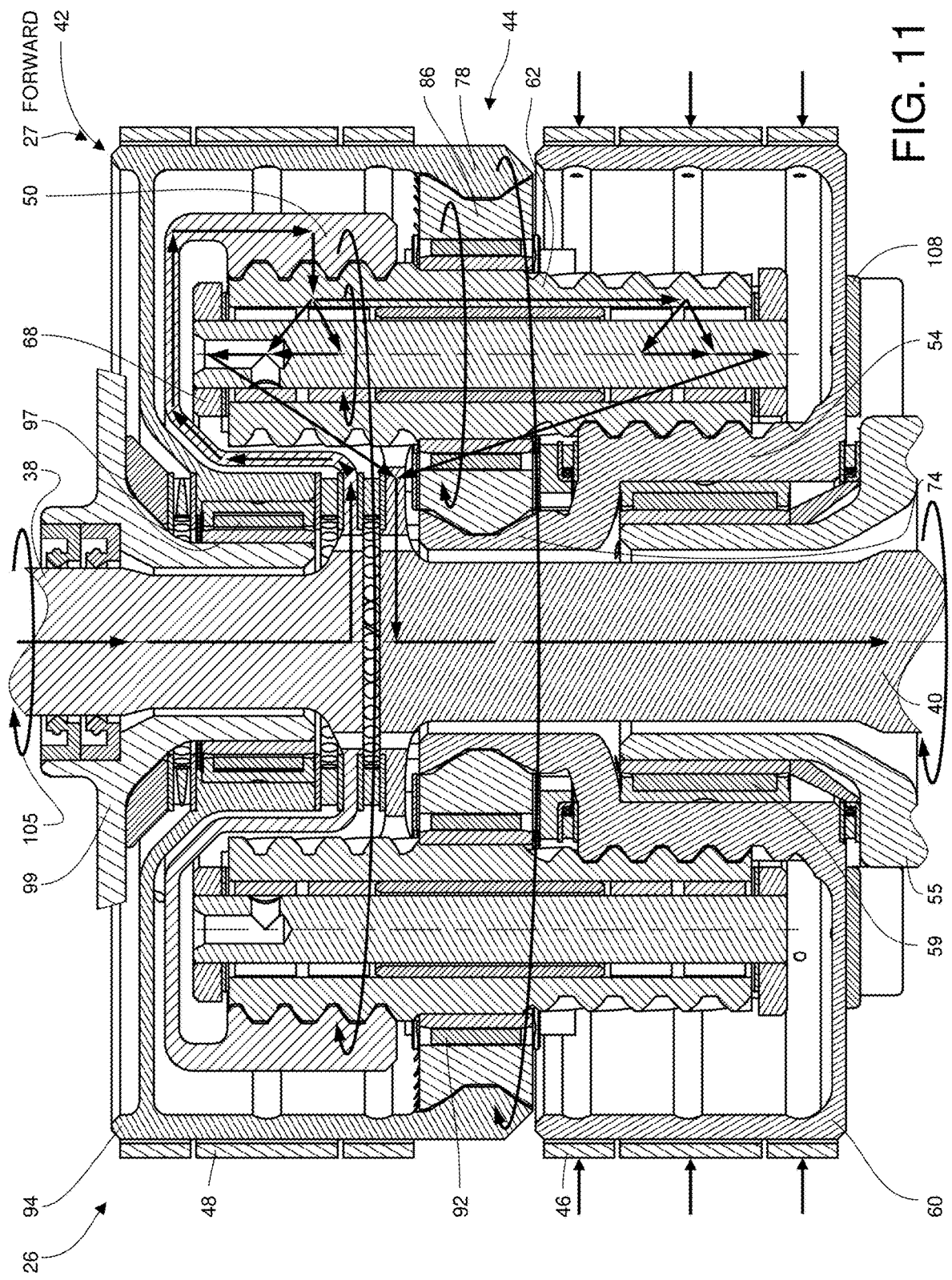
FIG. 11 is a view of section 10-10 taken in FIG. 2, showing the transmission in forward gear.
Figure 12:
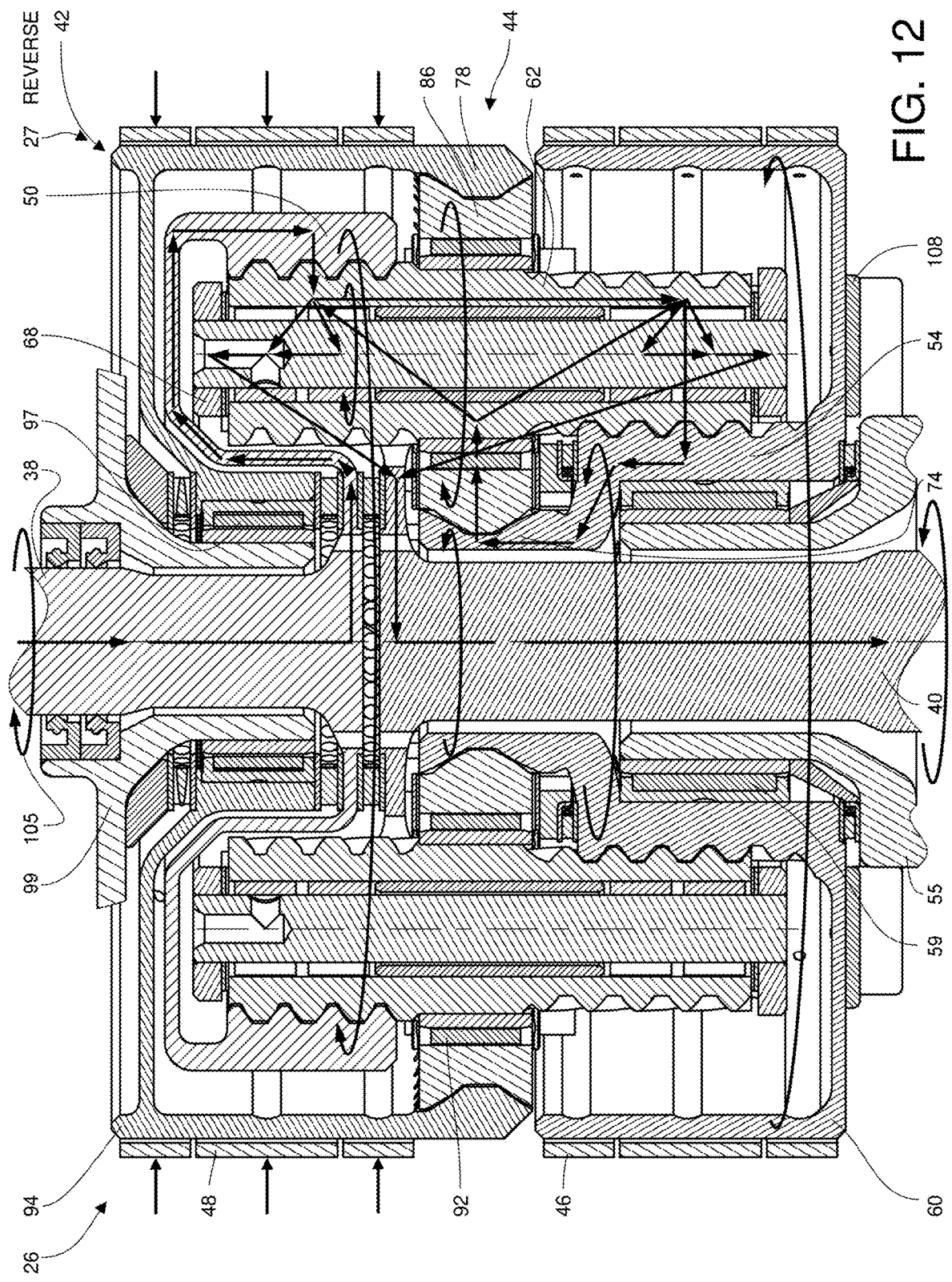
FIG. 12 is a view of section 10-10 taken in FIG. 2, showing the transmission in reverse gear.

Referring to FIGS. 10-12, the transmission 26 is able to engage the input shaft 38 with the output shaft 40 in neutral, forward and reverse gears. FIG. 10 shows the transmission 26 in neutral gear, wherein rotation of the input shaft 38 does not cause rotation of the output shaft 40. In the neutral gear, neither of the brakes 46, 48 are tightened about the brake drums 60, 94. That is, the actuators 96 have not moved the pins 100 in the directions of arrows 102. As such, both brake drums 60, 94 are free to rotate.

Thus forward rotation of the input shaft 38 (shown at arrow 105) causes forward rotation of the main ring gear 50. The forward rotation of the main ring gear 50 causes forward rotation of the main planet gears 62, which in turn causes reverse rotation of the main sun gear 54 and forward brake drum 60 and complementary sun gear 74. The reverse rotation of the complementary sun gear 74 causes forward rotation of the complementary planet gears 86, which causes forward rotation of the complementary ring gear 78 and reverse brake drum 94. The main carrier 68 and output shaft 40 remain stationary. The rotation of the input shaft 38 is not translated to the output shaft 40.

FIG. 11 depicts the transmission 26 in forward gear, wherein the forward brake 46 is actuated by the actuator 96 so as to move the pin 100 in the direction of arrow 102, which as described herein above, holds the forward brake drum 60 and main sun gear 54 and complementary sun gear 74 stationary. Forward rotation of the input shaft 38 (at 105) causes forward rotation of the main ring gear 50, which in turn causes forward rotation of the plurality of main planet gears 62 and forward rotation of the main carrier 68 and output shaft 40. The forward rotation of the main carrier 68 also results in forward rotation of the plurality of complementary planet gears 86 and forward rotation of the complementary ring gear 78 and reverse brake drum 94.

FIG. 12 shows the transmission 26 in reverse gear, wherein the actuator 96 moves the pin 100 in the direction of arrow 102, which as described herein above, holds the reverse brake drum 94 and complementary ring gear 78 stationary. Forward rotation of the input shaft 38 (at 105) causes forward rotation of the main ring gear 50, which in turn causes forward rotation of the plurality of main planet gears 62 and reverse rotation of the main sun gear 54 and forward brake drum 60 and complementary sun gear 74 also results in forward rotation of the plurality of complementary planet gears 86 and reverse rotation of the main carrier 68 and the output shaft 40.

In can thus be seen that rotation of the input shaft 38 simultaneously directly powers the main planetary gearset 42 and indirectly the complementary planetary gearset 44. More specifically, rotation of the input shaft 38 simultaneously, directly powers the main planetary gearset 42 via the main ring gear 50 and indirectly the complementary planetary gearset 44 via the main planetary gearset 42.

Figure 2:
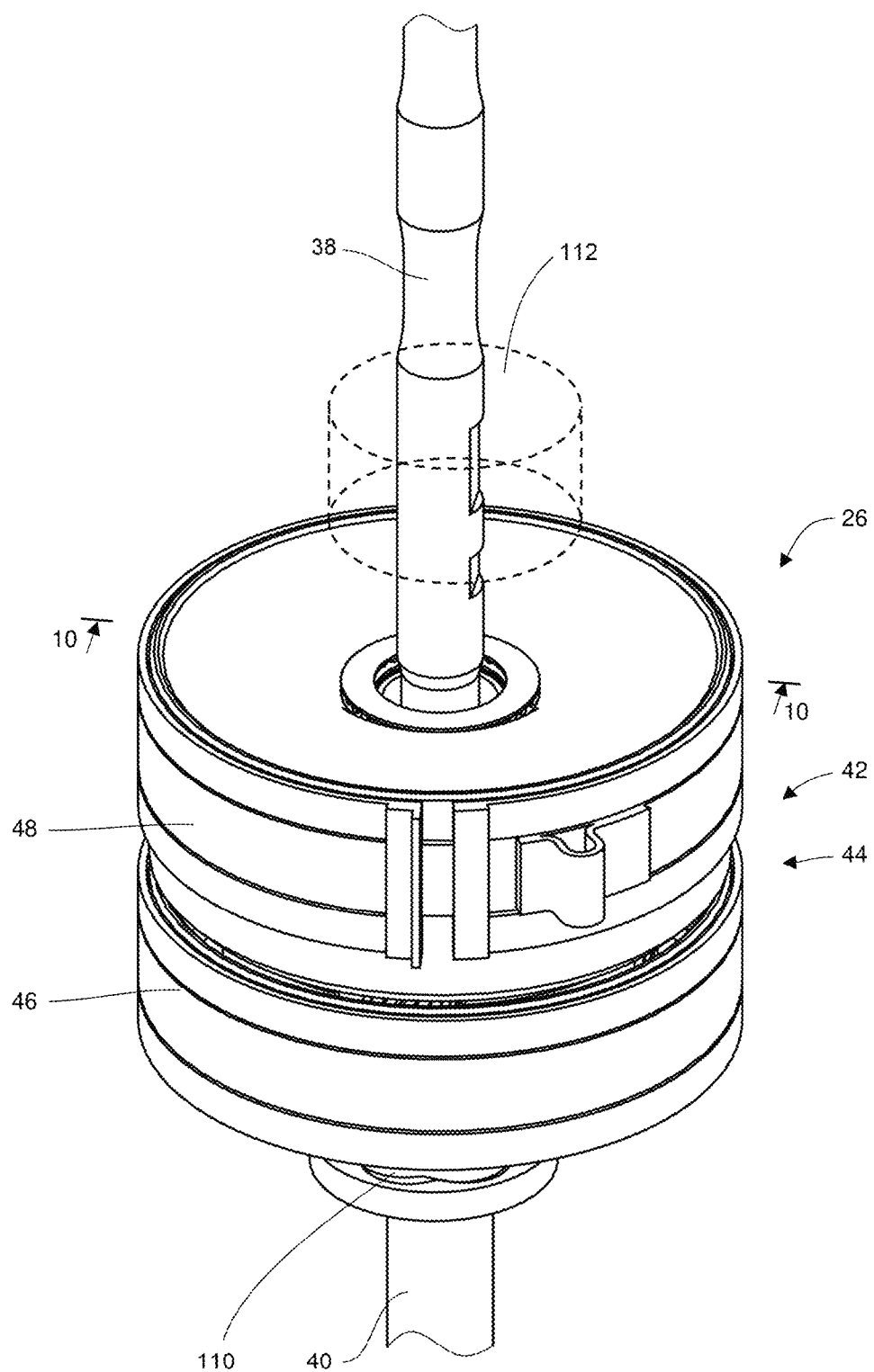
FIG. 2 is a perspective view of a transmission for the outboard marine propulsion device.
Figure 3:
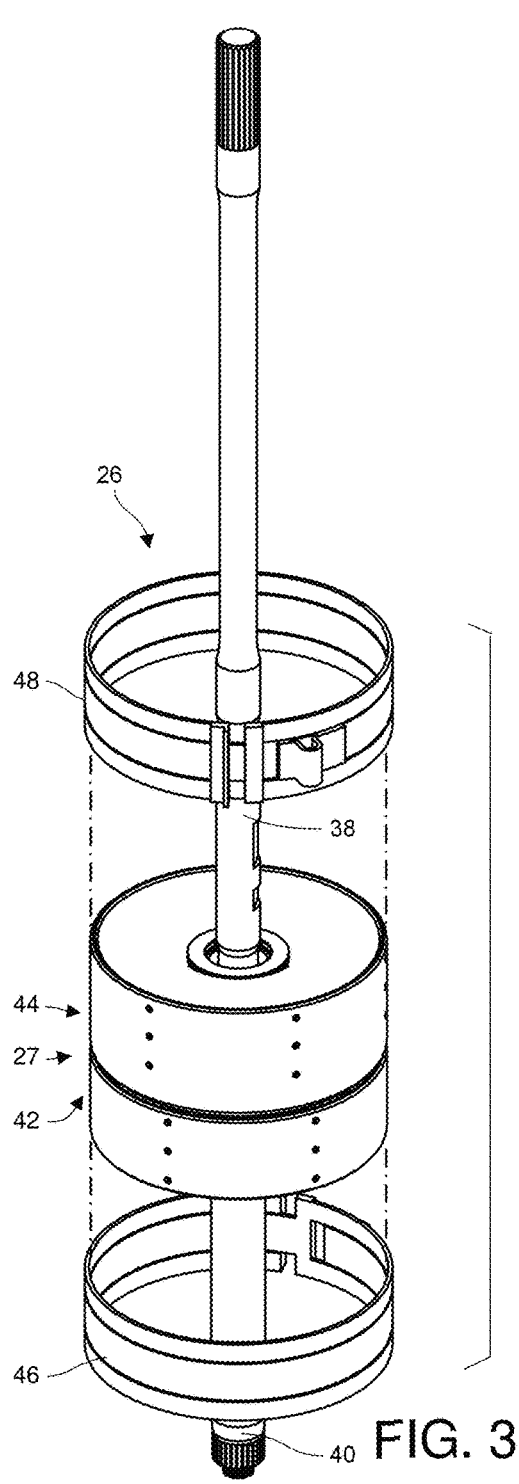
FIGS. 3-6 are exploded views of the transmission.
Figure 4:
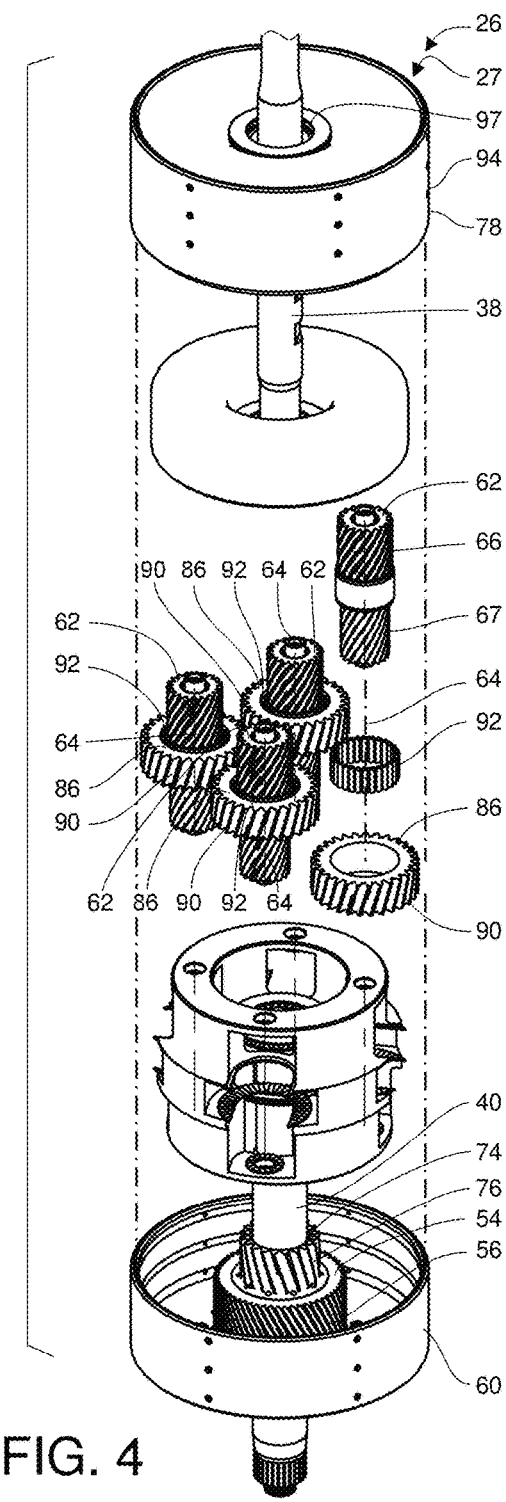
Figures 5, 6:
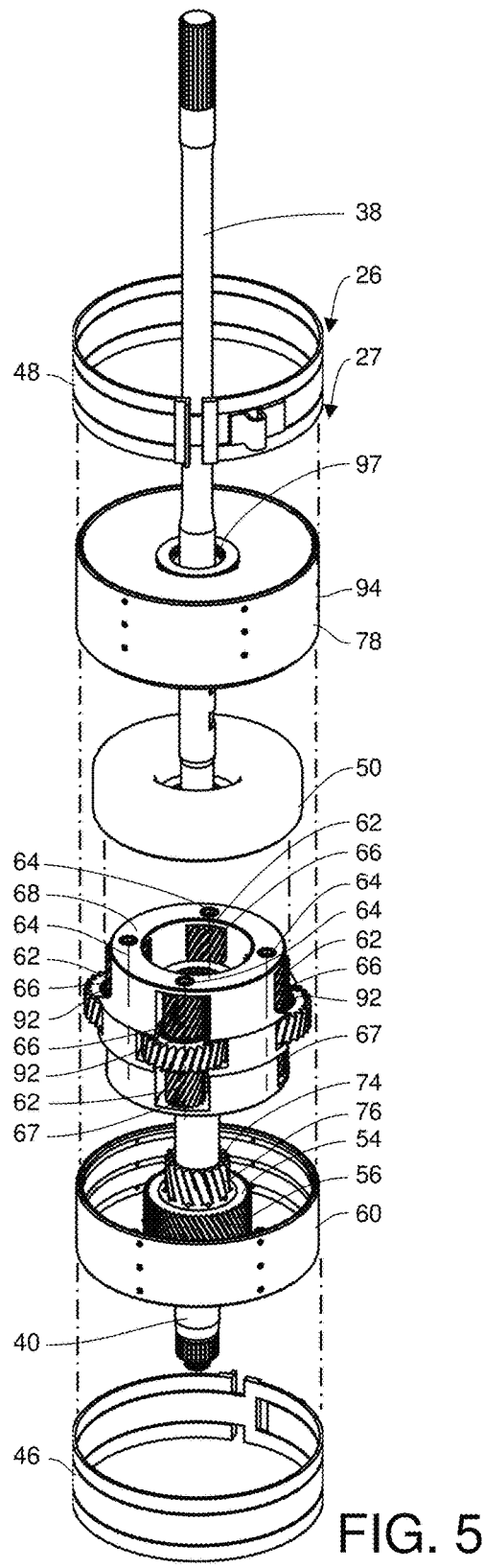

As shown in FIG. 2, the output shaft 40 is directly connected to a reversing lubrication pump 110 for providing lubrication, e.g. oil, to the transmission and lower gearbox unit 26. Thus the reversing lubrication pump 110 will operate any time that the engine 18 is operating and forward or reverse gear is engaged. A cooling water pump 112 is directly connected to the input shaft 38 such that rotation of the input shaft 38 causes the cooling water pump 112 to pump cooling water to the engine 18. Thus the cooling water pump 112 will operate any time that the engine 18 is operating. Neither the reversing lubrication pump 110 nor the cooling water pump 112 will change their operation based upon a change in forward or reverse gear implemented by the transmission 26. The reversing lubrication pump 110 will not operate in the neutral gear, when splashing blades 108 attached to the rotating main sun gear 54 provides enough lubrication. The cooling water pump 112 will operate at neutral or forward or reverse gear implemented by the transmission 26. The components of the transmission 26 can be made of various materials, including metal, including steel and for example cast iron, which dissipates heat.

Advantageously the transmission 26 can be configured to provide the same speed reduction in both forward and reverse gears, have a high power density compared to prior art. Advantageously the transmission 26 can sustain specified torque input, speed, shift cycles and transient conditions such as wave jump, throttle chop, and/or the like and still be located between the drive shaft housing 24 and the gearcase housing 32, for example within a minimum axial length, while still maintaining a hydrodynamic gearcase shape that minimizes drag. In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that for an expert various equivalents, alternatives and modifications are possible within the scope of the appended claims.

Figure 13:
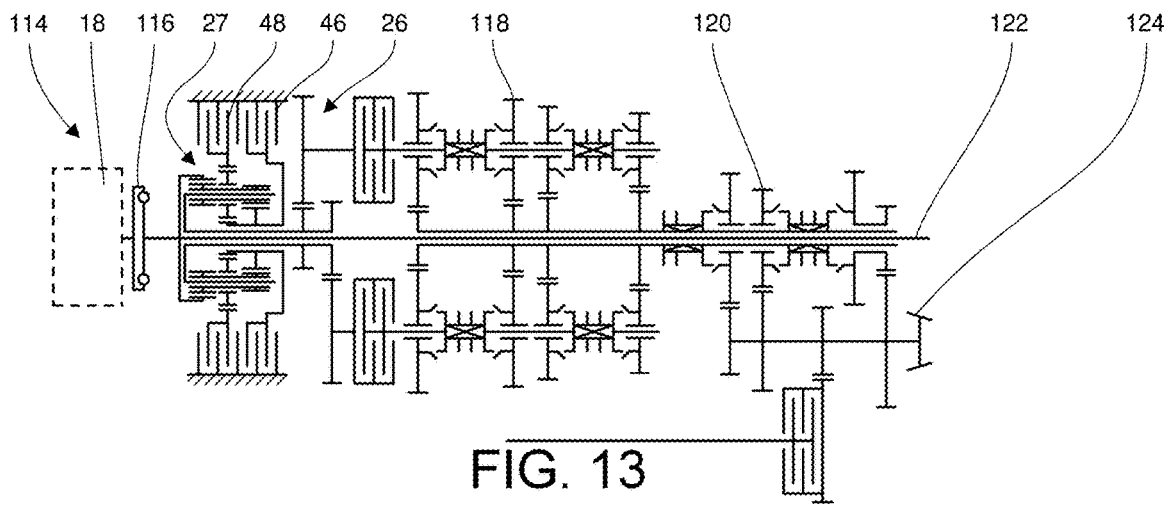
FIG. 13 is a schema of a tractor powertrain with the planetary gearset at an input of a drivetrain.
Figure 14:
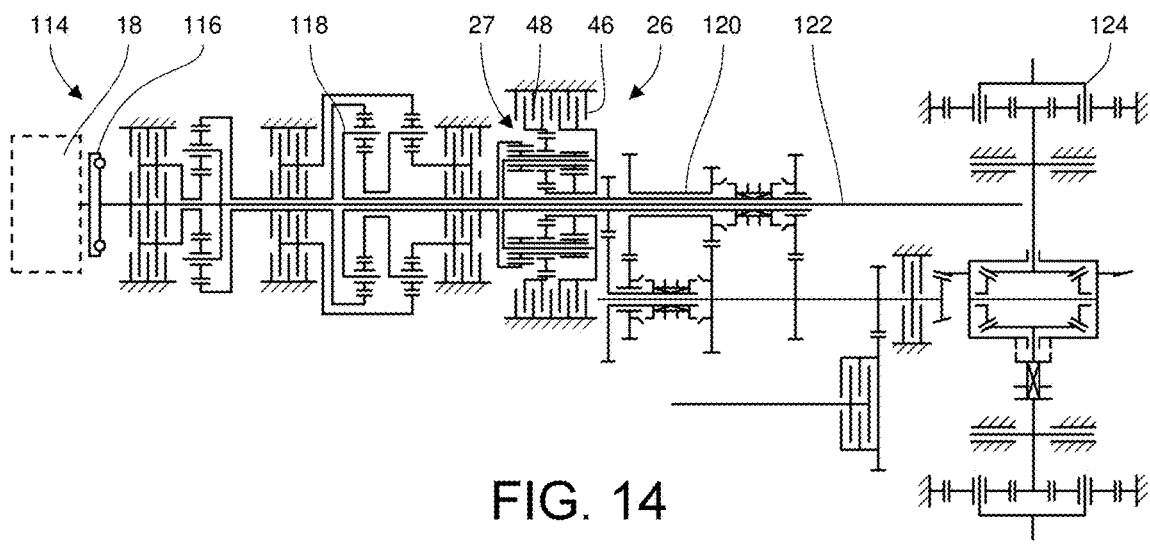
FIG. 14 is a schema of a tractor powertrain with the planetary gearset in the middle of a drivetrain.
Figure 15:
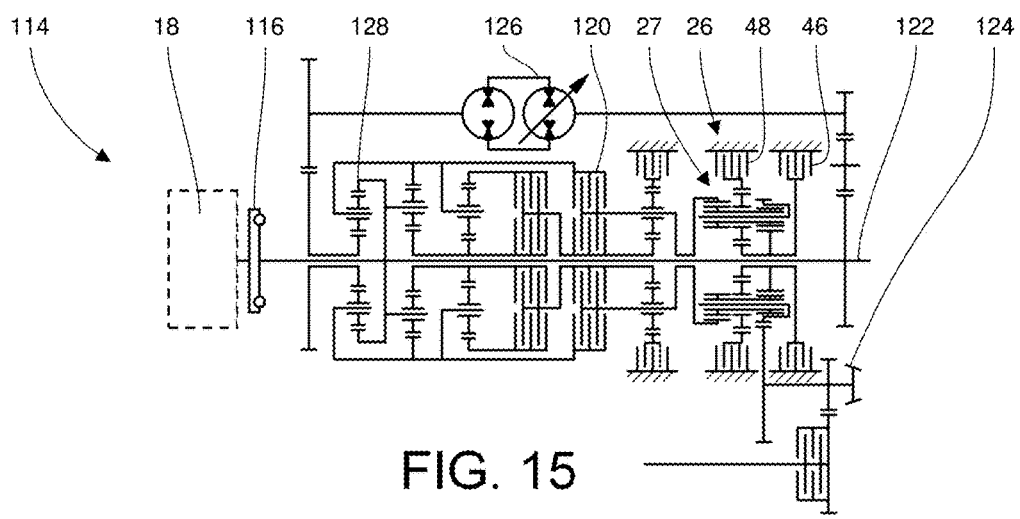
FIG. 15 is a schema of a tractor powertrain with the planetary gearset almost at the output of a drivetrain.

One of next examples of implementation of the planetary gearset 27 according to the invention represents e.g. construction of this planetary gearset 27 in the transmission 26 as a power reverser in a tractor powertrain 114 or another vehicle at the input of the drivetrain or in the middle of the drivetrain or almost at the output of the drivetrain, as shown in FIG. 13 and in FIG. 14 and in FIG. 15.

FIG. 13 shows an example of implementation of a tractor powertrain 114 with the transmission 26 located right behind the internal combustion engine 18 with a torsional vibration damper 116. Behind the transmission 26 can be a multispeed transmission 118 followed by a range change transmission 120 and a remaining vehicle drivetrain 124.

The forward brake 46 and reverse brake 48 can be also e.g. wet multi-disc brakes, as it is usual in automatic transmissions.

The transmission 26 can have a power take-off shaft 122 connected to the input shaft 38 and the output shaft 40 hollow so that the power take-off shaft 122 or another shaft e.g. for an oil pump 136 can go through it.

FIG. 14 shows an example of implementation, where the transmission 26 is located in the middle of the tractor powertrain 114. The transmission 26 is located behind the internal combustion engine 18 with the torsional vibration damper 116 and behind the multispeed transmission 118 thus in front of the range change transmission 120 and the remaining vehicle drivetrain 124, which can comprise a final drive with hub reduction gearing and transfer case for all wheel drive.

FIG. 15 shows an example of implementation, where the transmission 26 is located in the tractor powertrain 114 behind the internal combustion engine 18 with the torsional vibration damper 116 followed by a continuously variable transmission 126 and a power split planetary gearset 128 and then the range change transmission 120. Behind the transmission 26 is the remaining vehicle drivetrain 124.

In another examples also for another vehicles can be instead of the continuously variable transmission 126 with the power split planetary gearset 128 the continuously variable transmission 126 itself or the multispeed transmission 118. And instead of the range change transmission 120 can be the continuously variable transmission 126 with the power split planetary gearset 128 or the continuously variable transmission 126 itself or a single-speed drive or a direct drive in front of the remaining vehicle drivetrain 124.

Figure 16:
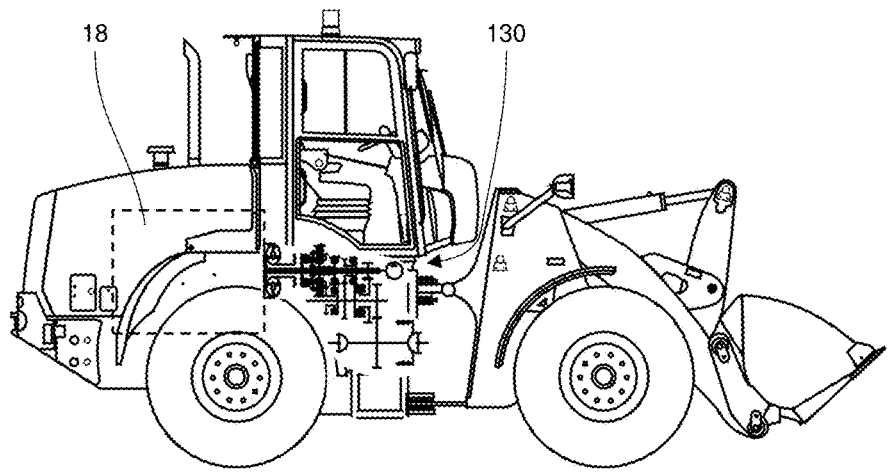
FIG. 16 is a view of a wheel loader with a transmission with a planetary gearset.

The planetary gearset 27 can be used also in a heavy equipment, specifically in a wheel loader transmission 130 as it is shown in FIG. 16.

Figure 17:
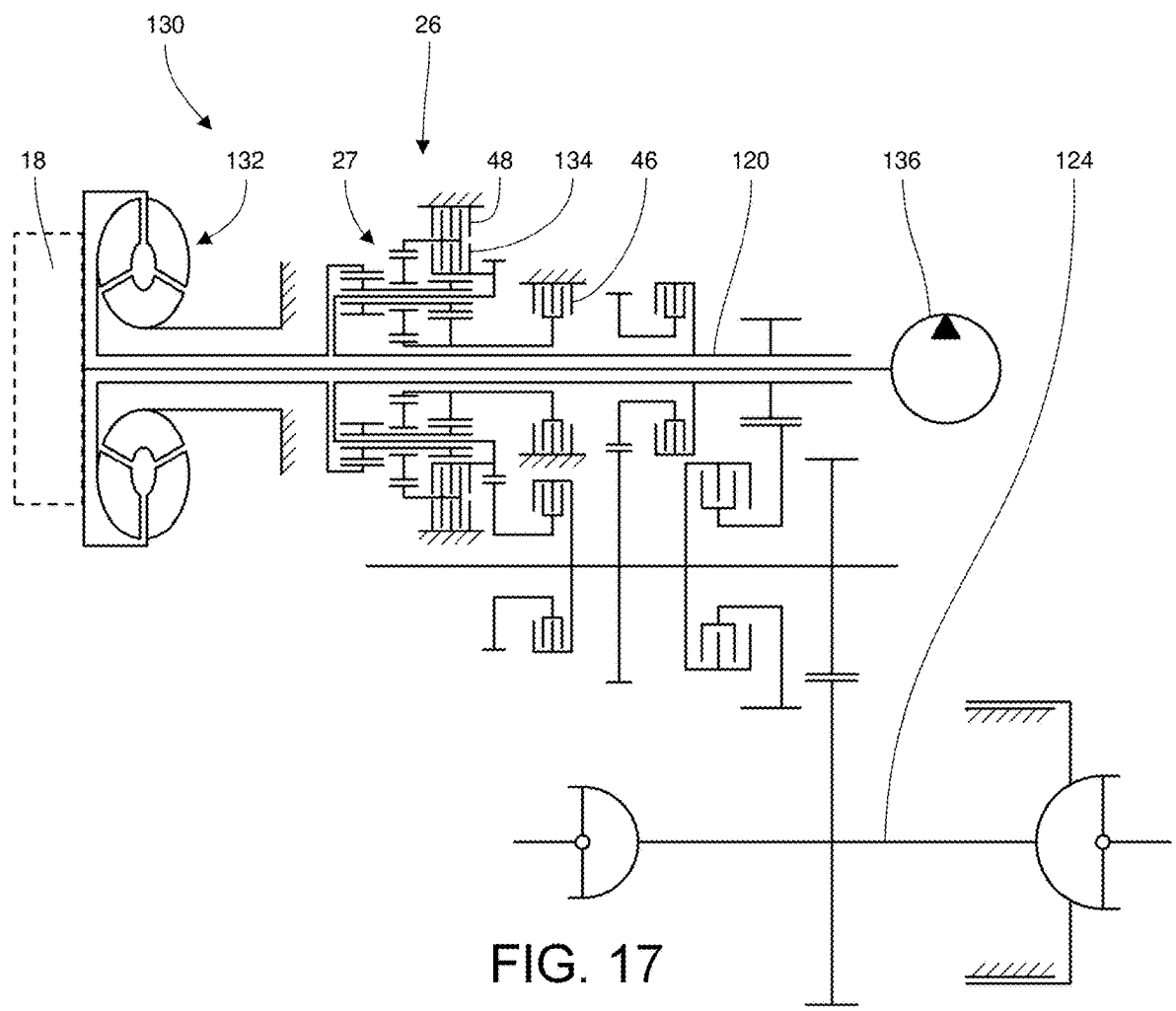
FIG. 17 is a scheme of a wheel loader transmission with a planetary gearset as shown in FIG. 16.

FIG. 17 shows an example of implementation of the wheel loader transmission 130, where the internal combustion engine 18 with a torque convertor 132 are located in front of the transmission 26 supplemented by a direct drive clutch 134. Behind the transmission 26 is then the range change transmission 120 and the remaining vehicle drivetrain 124.

The input shaft 38 can be also hollow so that the power take-off shaft 122 or another shaft e.g. for the oil pump 136 can go through it.

In another examples the transmission 26 can be used with the swapped input shaft 38 for the output shaft 40 for speed amplification, where the gear ratio thus the ratio of the input speed to the output speed is −0.6 or 0.6.

FIGS. 18-19 show the planetary gearset 27 with a plurality of complementary planet gears 86 that are coaxially aligned with the plurality of main planet gears 62 so that each main planet gear 62 is disposed inside each complementary planet gear 86 and that are rotatable about their own center axis 88 identical with center axis 64 of the main planet gears 62.

FIG. 20 shows the planetary gearset 27 with a plurality of main planet gears 62 between the plurality of complementary planet gears 86, where the center axes 88 of the complementary planet gears 86 are not identical with the center axes 64 of the main planet gears 62.

Figure 21:
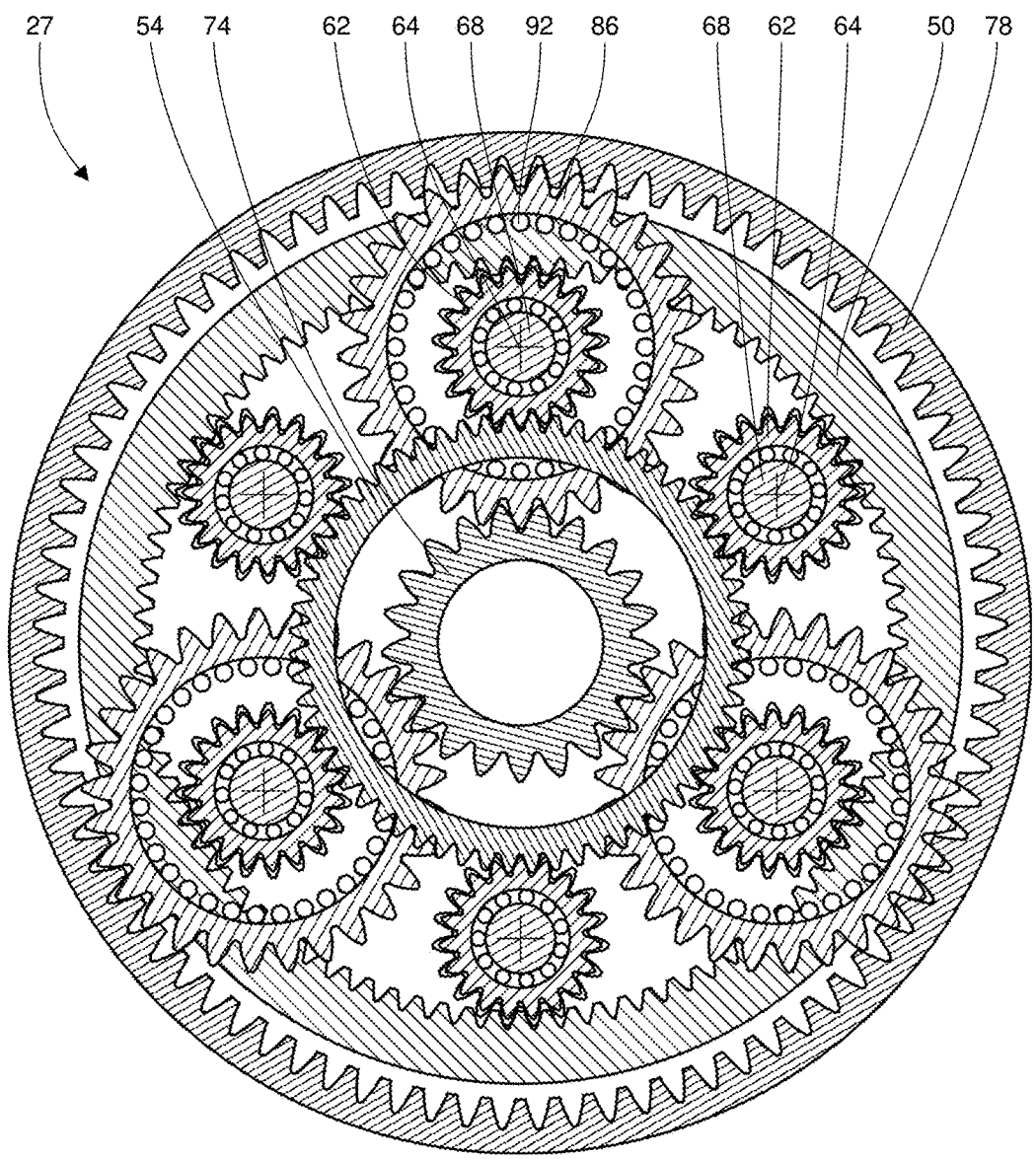
FIG. 21 is a view of a planetary gearset with main planet gears in and between complementary planet gears.

FIG. 21 shows the planetary gearset 27 with a plurality of complementary planet gears 86, some of which are coaxially aligned with the plurality of main planet gears 62 so that those main planet gears 62 are disposed inside each complementary planet gear 86 and that are rotatable about their own center axis 88 identical with center axis 64 of the main planet gears 62. The other main planet gears 62 are disposed between the complementary planet gears 86.

section 10-10
outboard marine propulsion device 11
marine vessel 12
transom 14
transom bracket 16
internal combustion engine 18
upper cowling 20
drive shaft 22
drive shaft housing 24
transmission 26
planetary gearset 27
propulsor shaft 28
propulsor shaft housing 30
gearcase housing 32
propulsor 34
counter rotating propellers 36
input shaft 38
output shaft 40
main planetary gearset 42
complementary planetary gearset 44
forward brake 46
reverse brake 48
main ring gear 50
radially inwardly facing gear surface 52
main sun gear 54

-continued lower casing extension 55
radially outwardly facing gear surface 56
radially inwardly facing bearing surface 58
roller bearing 59
forward brake drum 60
main planet gear 62
center axis 64
radially outwardly facing gear surface 66
radially outwardly facing gear surface 67
main carrier 68
complementary sun gear 74
radially outwardly facing gear surface 76
complementary ring gear 78
radially inwardly facing gear surface 84
complementary planet gear 86
center axis 88
radially outwardly facing gear surface 90
interplanetary bearing 92
reverse brake drum 94
actuator 96
bearing 97
servo-motor 98
upper casing extension 99
pin 100
arrow 102
arrow 103
bearing bracket 104
arrow 105
gearcase housing 106
splashing blades 108
reversing lubrication pump 110
cooling water pump 112
tractor powertrain 114
torsional vibration damper 116
multispeed transmission 118
range change transmission 120
power take-off shaft 122
remaining vehicle drivetrain 124
continuously variable transmission 126
power split planetary gearset 128
wheel loader transmission 130
torque convertor 132
direct drive clutch 134
oil pump 136

What is claimed is:

1. A planetary gearset, consisting of a main planetary gearset and a complementary planetary gearset,
wherein the main planetary gearset comprises a main ring gear, the main ring gear comprising a radially inwardly facing gear surface;
wherein the main planetary gearset further comprises a main sun gear that is disposed coaxially with the main ring gear, the main sun gear comprising a radially outwardly facing gear surface;
wherein the main planetary gearset further comprises a plurality of main planet gears that are rotatable about their own center axis and that are radially disposed between the main ring gear and the main sun gear, wherein each main planet gear comprises a radially outwardly facing gear surface that is engaged with the radially inwardly facing gear surface of the main ring gear and it also comprises another radially outwardly facing gear surface that is engaged with the radially outwardly facing surface of the main sun gear;
wherein the main planetary gearset further comprises a main carrier that retains the main planet gears and that is rotatable with respect to the main ring gear and the main sun gear;
wherein the complementary planetary gearset comprises a complementary sun gear, the complementary sun gear comprising a radially outwardly facing gear surface;
wherein the complementary planetary gearset further comprises a complementary ring gear, the complementary ring gear comprising a radially inwardly facing gear surface;
wherein the complementary planetary gearset further comprises a plurality of complementary planet gears that are rotatable about their own center axis and that are radially disposed between the complementary ring gear and the complementary sun gear, wherein each complementary planet gear comprises a radially outwardly facing gear surface that is engaged with the radially inward surface of the complementary ring gear and the radially outward surface of the complementary sun gear;
wherein each main planet gear is disposed coaxially inside each complementary planet gear;
wherein the complementary planetary gearset further comprises interplanetary bearings;
wherein the complementary planet gears are retained by the interplanetary bearings and the main planet gears and the main carrier and rotate about their own center axis identical with center axis of the main planet gears.

2. The planetary gearset according to claim 1,
wherein the main ring gear is fixed to and rotates with an input shaft;
and wherein the main carrier is fixed to and rotates with an output shaft;
and wherein the complementary sun gear is fixed to and rotates with the main sun gear.

3. A planetary gearset, consisting of a main planetary gearset and a complementary planetary gearset,
wherein the main planetary gearset comprises a main ring gear, the main ring gear comprising a radially inwardly facing gear surface;
wherein the main planetary gearset further comprises a main sun gear that is disposed coaxially with the main ring gear, the main sun gear comprising a radially outwardly facing gear surface;
wherein the main planetary gearset further comprises a plurality of main planet gears that are rotatable about their own center axis and that are radially disposed between the main ring gear and the main sun gear, wherein each main planet gear comprises a radially outwardly facing gear surface that is engaged with the radially inwardly facing gear surface of the main ring gear and it also comprises another radially outwardly facing gear surface that is engaged with the radially outwardly facing surface of the main sun gear;
wherein the main planetary gearset further comprises a main carrier that retains the main planet gears and that is rotatable with respect to the main ring gear and the main sun gear;
wherein the complementary planetary gearset comprises a complementary sun gear, the complementary sun gear comprising a radially outwardly facing gear surface;
wherein the complementary planetary gearset further comprises a complementary ring gear, the complementary ring gear comprising a radially inwardly facing gear surface;
wherein the complementary planetary gearset further comprises a plurality of complementary planet gears that are rotatable about their own center axis and that are radially disposed between the complementary ring gear and the complementary sun gear, wherein each complementary planet gear comprises a radially outwardly facing gear surface that is engaged with the radially inward surface of the complementary ring gear and the radially outward surface of the complementary sun gear;

wherein the main planet gears are disposed between the complementary sun gear and the complementary ring gear and at the same time the complementary planet gears are disposed between the main planet gears;

wherein the complementary planet gears are retained in the main carrier and rotate about their own center axis.

4. The planetary gearset according to claim 3, wherein the main ring gear is fixed to and rotates with an input shaft;

and wherein the main carrier is fixed to and rotates with an output shaft;

and wherein the complementary sun gear is fixed to and rotates with the main sun gear.

5. The transmission according to claim 4, wherein rotation of the input shaft simultaneously directly powers the main planetary gearset and indirectly the complementary planetary gearset.

6. The transmission according to claim 4, comprising a reversing lubrication pump connected to the output shaft such that rotation of the output shaft in any direction powers the reversing lubrication pump.

7. The transmission according to claim 4, comprising a water pump connected to the input shaft, wherein rotation of the input shaft powers the water pump.

8. A transmission for a marine propulsion device having an internal combustion engine that drives a propulsor for propelling a marine vessel in water, the transmission comprising:

an input shaft that is driven into rotation by the engine;

an output shaft that drives the propulsor into rotation, a main planetary gearset that connects the input shaft to the output shaft so as to drive the output shaft into forward rotation;

a complementary planetary gearset together with the main planetary gearset that connects the input shaft to the output shaft so as to drive the output shaft into reverse rotation, a forward brake that engages the main planetary gearset in a forward gear in which the main planetary gearset drives the output shaft into the forward rotation; and a reverse brake that engages the complementary planetary gearset in a reverse gear in which the complementary planetary gearset together with the main planetary gearset drive the output shaft into the reverse rotation;

wherein actuation of neither of the forward brake and the reverse brake actuates a neutral gear in which the output shaft is disconnected from the input shaft;

wherein the main planetary gearset comprises a main ring gear that is fixed to and rotates with the input shaft, the main ring gear comprising a radially inwardly facing gear surface;

wherein the main planetary gearset further comprises a main sun gear that is coaxially disposed on a lower casing extension, the main sun gear comprising a radially outwardly facing gear surface;

wherein the main sun gear comprises a radially inwardly facing bearing surface that bears on the lower casing extension such that the main sun gear is rotatable with respect to the lower casing extension; and wherein the main planetary gearset further comprises a forward brake drum that rotates with the main sun gear;

wherein the main planetary gearset further comprises a plurality of main planet gears that are rotatable about their own center axis and that are radially disposed between the main ring gear and the main sun gear, wherein each main planet gear in the plurality of main planet gears comprises a radially outwardly facing gear surface that is engaged with the radially inwardly facing gear surface of the main ring gear and it also comprises another radially outwardly facing gear surface that is engaged with the radially outwardly facing gear surface of the main sun gear;

wherein the main planetary gearset further comprises a main carrier that retains the plurality of main planet gears, wherein the main carrier is fixed to and rotates with the output shaft, and wherein the main carrier is rotatable with respect to the main ring gear and the main sun gear;

wherein the complementary planetary gearset comprises a complementary sun gear that is fixed to and rotates with the main sun gear and forward brake drum, the complementary sun gear comprising a radially outwardly facing gear surface;

wherein the complementary planetary gearset further comprises a complementary ring gear that is fixed to and rotates with a reverse brake drum, the complementary ring gear comprising radially inwardly facing gear surface;

wherein the complementary planetary gearset further comprises a plurality of complementary planet gears that are coaxially aligned with the plurality of main planet gears so that each main planet gear is disposed inside each complementary planet gear and that are rotatable about their own center axis and that are radially disposed between the complementary ring gear and the complementary sun gear, wherein each complementary planet gear in the plurality of complementary planet gears comprises a radially outwardly facing gear surface that is engaged with the radially inwardly facing gear surface of the complementary ring gear and the radially outwardly facing gear surface of the complementary sun gear;

wherein the complementary planetary gearset further comprises interplanetary bearings and further uses main planet gears and main carrier to retain the complementary planet gears so that the complementary planet gears can rotate about their own center axis identical with center axis of the main planet gears;

wherein in neutral gear, rotation of the input shaft does not cause rotation of the output shaft;

wherein in neutral gear, forward rotation of the input shaft causes forward rotation of the main ring gear, which causes forward rotation of the plurality of main planet gears, and which in turn causes reverse rotation of the main sun gear and forward brake drum and complementary sun gear, which further causes forward rotation of the plurality of complementary planet gears, which causes forward rotation of the complementary ring gear and the reverse brake drum.

9. The transmission according to claim 8, wherein the forward brake and the reverse brake are band brakes that act on the forward brake drum and reverse brake drum, respectively.

10. The transmission according to claim 8, wherein at least one of the forward and reverse brakes comprises a double-wrapped band brake.

11. The transmission according to claim 10, wherein in reverse gear;

the complementary ring gear is held stationary by the reverse brake; and forward rotation of the input shaft causes forward rotation of the main ring gear, which causes forward rotation of the plurality of main planet gears and reverse rotation of the main sun gear and forward brake drum and complementary sun gear also results in forward rotation of the plurality of complementary planet gears and reverse rotation of the main carrier and the output shaft.

12. The transmission according to claim 8, further comprising an actuator that actuates at least one of the forward or reverse brake.

13. The transmission according to claim 12, wherein rotation of the input shaft simultaneously directly powers the main planetary gearset via the main ring gear and indirectly the complementary planetary gearset via the main planetary gearset.

14. The transmission according to claim 13, comprising a first bearing that supports the forward brake drum and a second bearing that supports the reverse brake drum, wherein the first and second bearings are coaxially aligned.

15. The transmission according to claim 8, wherein in forward gear:
the forward brake drum and the main sun gear are held stationary by the forward brake; and forward rotation of the input shaft causes forward rotation of the main ring gear, which causes forward rotation of the plurality of main planet gears and forward rotation of the main carrier and the output shaft.

16. The transmission according to claim 4, wherein the output shaft and input shaft are coaxially aligned.

17. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a main planetary gearset that connects the input shaft to the output shaft so as to drive the output shaft into forward rotation;
a complementary planetary gearset that together with the main planetary gearset connect the input shaft to the output shaft so as to drive the output shaft into reverse rotation;
a forward brake that engages the main planetary gearset in a forward gear wherein the main planetary gearset drives the output shaft into the forward rotation; and
a reverse brake that engages the complementary planetary gearset in a reverse gear wherein the complementary planetary gearset together with the main planetary gearset drive the output shaft into the reverse rotation;
wherein the main planetary gearset comprises
a main ring gear that is fixed to and rotates with the input shaft, the main ring gear comprising a radially inwardly facing gear surface,
a main sun gear that is coaxially disposed on a lower casing extension, the main sun gear comprising a radially outwardly facing gear surface,
a radially inwardly facing bearing surface that bears on the lower casing extension such that the main sun gear is rotatable with respect to the lower casing extension,
a forward brake drum that rotates with the main sun gear,
a plurality of main planet gears that are rotatable about their own center axis and that are radially disposed between the main ring gear and the main sun gear, wherein each main planet gear in the plurality of main planet gears comprises a radially outwardly facing gear surface that is engaged with the radially inwardly facing gear surface of the main ring gear and it also comprises another radially outwardly facing gear surface that is engaged with the radially outwardly facing gear surface of the main sun gear, and
a main carrier that retains the plurality of main planet gears, wherein the main carrier is fixed to and rotates with the output shaft, and wherein the main carrier is rotatable with respect to the main ring gear and the main sun gear, and
wherein in the forward gear the forward brake drum and the main sun gear are held stationary by the forward brake, and forward rotation of the input shaft causes forward rotation of the main ring gear, which causes forward rotation of the plurality of main planet gears and forward rotation of the main carrier and the output shaft.

18. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a main planetary gearset that connects the input shaft to the output shaft so as to drive the output shaft into forward rotation, the main planetary gearset comprising a main carrier;
a complementary planetary gearset that together with the main planetary gearset connect the input shaft to the output shaft so as to drive the output shaft into reverse rotation;
a forward brake that engages the main planetary gearset in a forward gear wherein the main planetary gearset drives the output shaft into the forward rotation; and
a reverse brake that engages the complementary planetary gearset in a reverse gear wherein the complementary planetary gearset together with the main planetary gearset drive the output shaft into the reverse rotation;
wherein the main planetary gearset comprises
a main ring gear that is fixed to and rotates with the input shaft, the main ring gear comprising a radially inwardly facing gear surface,
a main sun gear that is coaxially disposed on a lower casing extension, the main sun gear comprising a radially outwardly facing gear surface,
a radially inwardly facing bearing surface that bears on the lower casing extension such that the main sun gear is rotatable with respect to the lower casing extension,
a forward brake drum that rotates with the main sun gear,
a plurality of main planet gears that are rotatable about their own center axis and that are radially disposed between the main ring gear and the main sun gear, wherein each main planet gear in the plurality of main planet gears comprises a radially outwardly facing gear surface that is engaged with the radially inwardly facing gear surface of the main ring gear and it also comprises another radially outwardly facing gear surface that is engaged with the radially outwardly facing gear surface of the main sun gear, and
a main carrier that retains the plurality of main planet gears, wherein the main carrier is fixed to and rotates with the output shaft, and wherein the main carrier is rotatable with respect to the main ring gear and the main sun gear, and
wherein the complementary planetary gearset comprises
a complementary sun gear that is fixed to and rotates with the main sun gear and forward brake drum, the complementary sun gear comprising a radially outwardly facing gear surface, a complementary ring gear that is fixed to and rotates with a reverse brake drum, the complementary ring gear comprising a radially inwardly facing gear surface, a plurality of complementary planet gears that are coaxially aligned with the plurality of main planet gears so that each main planet gear is disposed inside each complementary planet gear and that are rotatable about their own center axis and that are radially disposed between the complementary ring gear and the complementary sun gear, wherein each complementary planet gear in the plurality of complementary planet gears comprises a radially outwardly facing gear surface that is engaged with the radially inwardly facing gear surface of the complementary ring gear and the radially outwardly facing gear surface of the complementary sun gear, a plurality of interplanetary bearings disposed on the main planet gears and main carrier that retain the plurality of complementary planet gears so that the complementary planet gears can rotate about their own center axis identical with center axis of the main planet gears, the reverse brake drum that rotates with the complementary ring gear, wherein in the reverse gear the complementary ring gear is held stationary by the reverse brake and forward rotation of the input shaft causes forward rotation of the main ring gear, which in turn causes forward rotation of the plurality of main planet gears and reverse rotation of the main sun gear and forward brake drum and complementary sun gear also results in forward rotation of the plurality of complementary planet gears and reverse rotation of the main carrier and the output shaft.

* * * * *